May 31, 1960  B. D. GOODRICH  2,938,569
CASING END SEALS AND METHODS OF CONSTRUCTING
AND APPLYING THE SAME
Filed April 3, 1953  2 Sheets-Sheet 1
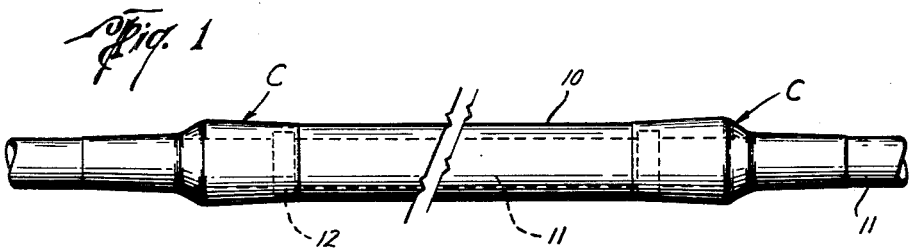
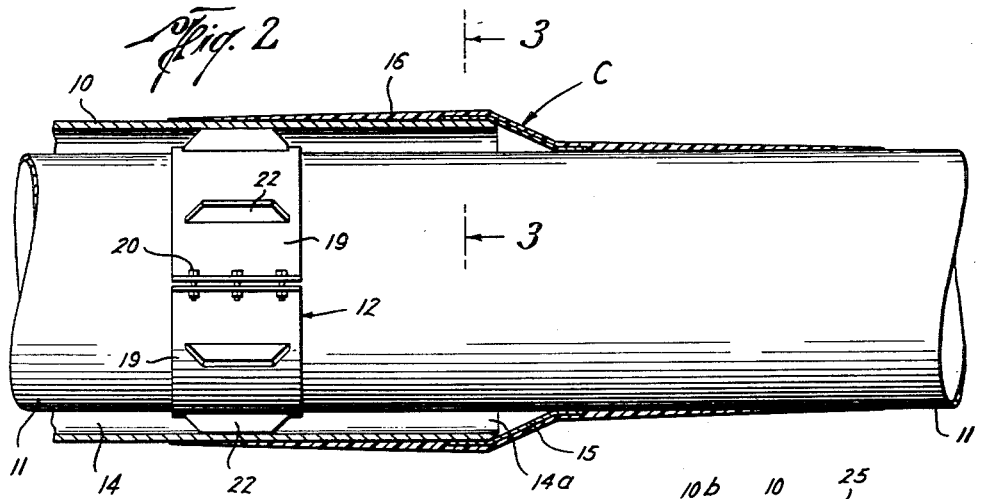
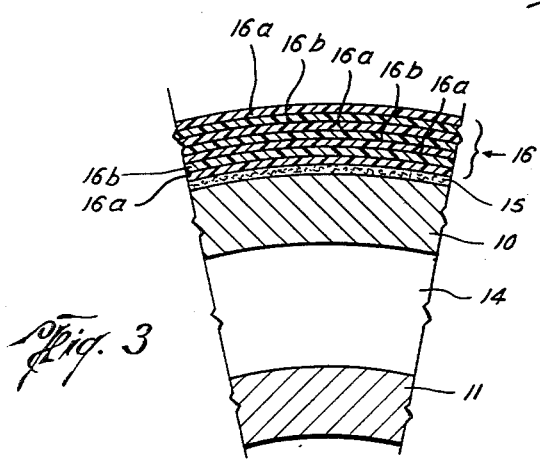
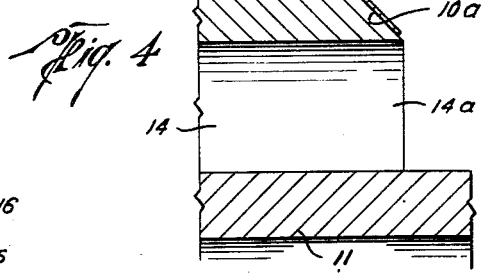
Baxter D. Goodrich
INVENTOR.
BY J. Vincent Martin
Joe E. Edwards
B. R. Pravel
ATTORNEYS

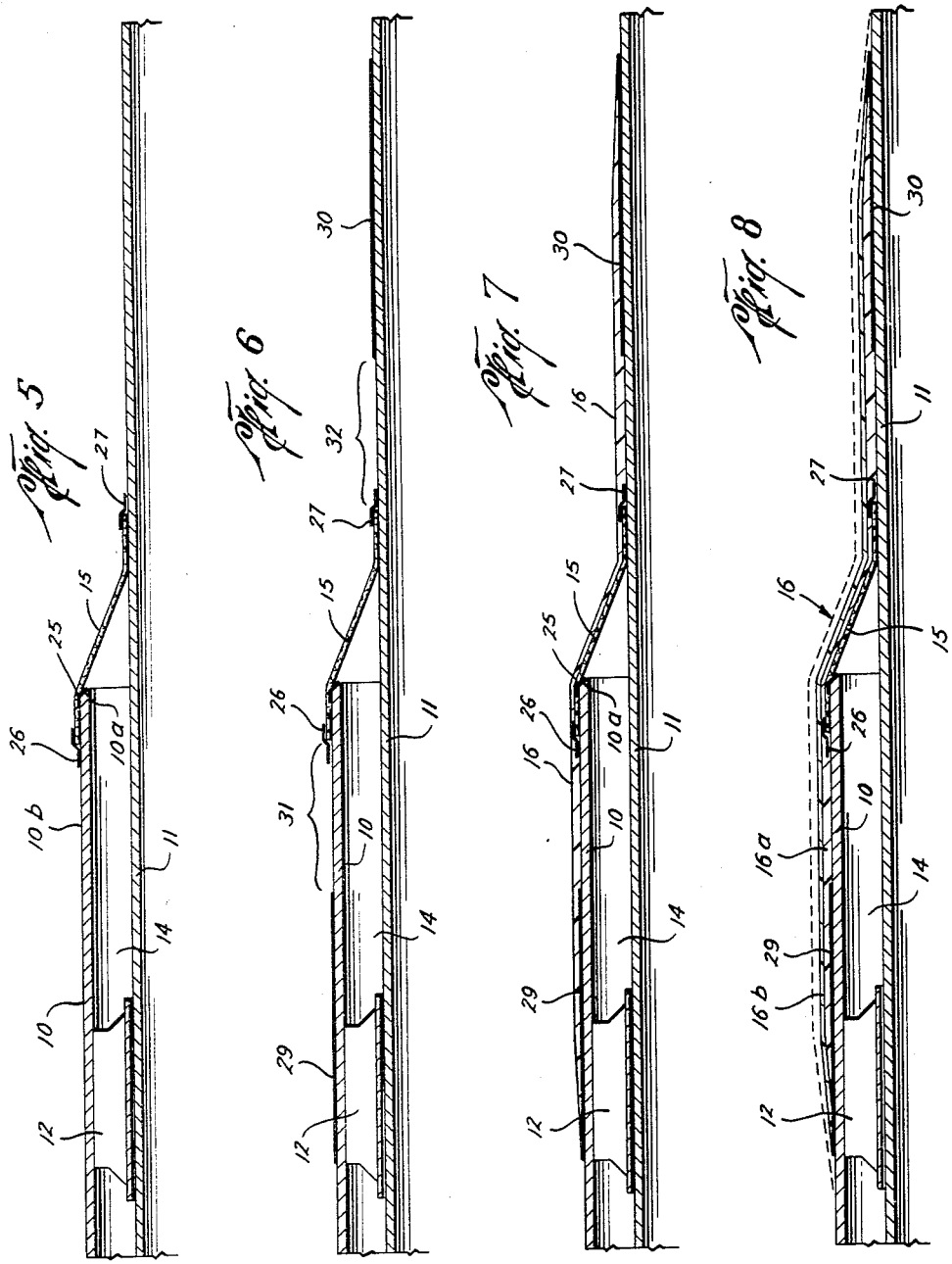

United States Patent Office 2,938,569
Patented May 31, 1960

2,938,569

CASING END SEALS AND METHODS OF CONSTRUCTING AND APPLYING THE SAME

Baxter D. Goodrich, Shreveport, La., assignor to Texas Eastern Transmission Corporation, Shreveport, La., a corporation of Delaware Filed Apr. 3, 1953, Ser. No. 346,614

9 Claims. (Cl. 154—41)

This invention relates to new and useful improvements in casing end seals and methods of constructing and applying the same.

In the laying of pipelines, the pipeline must often pass under roadways, railroads or similar heavily loaded areas. To protect a section of pipeline which passes under such heavily loaded areas, and to avoid the leakage of gas or fluid from the pipeline through the roadbed, an outer casing is generally provided around the section of the pipeline passing under the roadway or similar area. The section of pipeline extending through the casing is commonly referred to as the inner carrier pipe; the carrier pipe and the casing are spaced from each other by electrical insulating supports so that an annular space is provided between the carrier pipe and the casing.

In the past, the annular space between the carrier pipe and the casing has been sealed off by casing end seals provided at each end of the casing for the purpose of preventing moisture or water from entering the annular space; the entrance of moisture or water within said annular space is undesirable since it functions as an electrical conductor and causes electrical shorting out of the casing with consequent pitting and other damage to said casing, as well as to the inner carrier pipe.

However, so far as is known, the prior casing end seals have not been moistureproof or sufficiently waterproof to adequately prevent the entrance of this moisture or water into the annular space between the carrier pipe and casing. The problem is aggravated by the fact that the carrier pipe often shifts longitudinally or axially relative to the casing which shifting or movement subjects the end seals to rupturing or displacement, whereby said seals are rendered ineffective for their intended purpose.

It is therefore an object of this invention to provide a casing end seal for sealing off the annular space between a casing and an inner carrier pipe and a method of forming said seal wherein the seal is electrically nonconducting, moistureproof, waterproof and is sufficiently flexible to compensate for longitudinal or axial movement of the inner carrier pipe relative to the casing, whereby the seal maintains its effectiveness under all conditions.

An important object of this invention is to provide a casing end seal wherein the method of applying the same involves the application of a base or supporting element and a flexible sealing coat thereover, said layer and coat spanning the area between the casing end and exterior of the carrier pipe to seal off the annular open end between the casing and the inner carrier pipe, whereby a moistureproof, waterproof, flexible closure is provided.

Another object of this invention is to provide a casing end seal and a method of making the same wherein the seal is provided at the open annular space between the end of an outer casing and an inner carrier pipe extending therethrough, said seal being effective whether said inner carrier pipe extends concentrically or eccentrically through said casing.

A further object of the invention is to provide an improved method of forming an end seal between a carrier pipe and casing which method involves attaching a base or forming element of material having stretching qualities to the casing end and pipe in a position spanning the annular space between said pipe and casing, and thereafter applying an outer coat of plastic sealing material to the forming element and also to the pipe and casing adjacent to the ends of the layer, whereby said sealing material spans the annular space between said pipe and casing to effectively close said space.

Another object is to provide a method, of the character described, wherein the plastic sealing material may be applied by spraying the same upon the base layer, casing and pipe, whereby distribution of the material in a desired manner and to a desired thickness is facilitated.

A particular object is to provide a plastic seal of the character described wherein the seal may be formed of a single layer of plastic coating material having the required properties or may be formed of a plurality of layers of coating and fusing materials which layers are alternately disposed with respect to each other with the fusing layers functioning to fuse all layers together into a composite body.

A further object of this invention is to provide a casing end seal and a method of making same, wherein an annular element of flexible or stretchable reinforcing material is disposed around the end of the casing with a portion of the annular element extending from the casing end and surrounding the inner carrier pipe, together with layers of sealing coats applied over and bonded to the flexible material and to the casing and pipe to provide a moistureproof and waterproof seal for effectively closing the annular space between the casing and pipe.

The construction designed to carry out the invention will be hereinafter described, together with other features thereof.

The invention will be more readily understood from a reading of the following specifications and by reference to the accompanying drawings forming a part thereof, wherein an example of the invention is shown, and wherein:

Fig. 1 is an elevational view illustrating the casing end seal of this invention disposed on the ends of a casing having an inner carrier pipe extending therethrough.

Fig. 2 is a view partly in elevation and partly in section illustrating an end casing seal of this invention.

Fig. 3 is a sectional view taken on line 3—3 of Fig. 2.

Fig. 4 is a detail sectional view of a portion of the outer casing and the inner carrier pipe, and particularly illustrating the preparation of the casing end prior to the application thereto of the seal.

Fig. 5 is a sectional view illustrating the step of applying an annular forming layer to the end of the casing and the inner carrier pipe.

Fig. 6 is a view similar to Fig. 5 and illustrates the step of applying an annular area of adhesive on the casing and the inner carrier pipe spaced from the ends of the forming layer.

Fig. 7 is a view similar to Fig. 5 and illustrates the step of applying the first layer of the sealing coat to the casing and inner pipe.

Fig. 8 is a view similar to Fig. 5 and illustrates the step of applying alternate layers of sealing and fusing material to form the sealing coat.

In the drawings, the letter C designates generally the end casing seal of this invention, which is secured to the external surface of an outer casing or pipe 10 at the end thereof and the external surface of an inner carrier pipe 11 which extends through the casing 10 and projects therefrom. The inner carrier pipe 11 is a part of a pipe line which has casings such as the casing 10 disposed therearound at areas in which the pipe line must pass under a roadway or a similar heavily loaded area. To prevent electrical conduction between the casing 10 and the inner carrier pipe 11, the inner pipe 11 is spaced from the casing 10 by an electrical insulating support 12, whereby an annular space 14 is formed between the casing 10 and the inner carrier pipe 11. The casing seal C of this invention seals off the open end 14a of the annular space 14 at each end of the casing 10. Broadly, the casing end seal C includes an annular layer of molding or base material 15 and an outer sealing coat 16 which covers the layer 15 and is secured to the casing 10 and the inner carrier pipe 11 so as to provide a moistureproof, waterproof, electrically non-conducting seal which is flexible so as to compensate for longitudinal or other movement of the inner carrier pipe 11 relative to the outer casing 10 while maintaining an effective seal.

The spacer support 12 which is made of an electrically non-conducting or insulating material, and which is shown in Fig. 2, is merely illustrative of the type of spacer supports which are used for spacing the inner carrier pipe with respect to the outer casing. The spacer support 12 as illustrated in Fig. 2 includes two semi-cylindrical bands 19, which are joined together by bolts 20 or similar securing means. Each band 19 has a plurality of radial ribs 22 which project outwardly therefrom for contact with the interior of the casing 10. When the bands 19 are bolted to the inner carrier pipe 11, the inner pipe 11 is spaced from the outer casing 10 by the radial projections or ribs 22 to thereby form the annular space 14 between the casing 10 and the inner pipe 11.

In carrying out the method of this invention to form the end seal C for closing the annular space 14, the edge 10a of the casing 10, which is usually beveled (Fig. 4), is filed to remove any burrs or sharp projections thereon. Then, to avoid any possibility of the edge 10a cutting the casing seal C as it is applied, or during use, an annular strip of masking tape 25 is positioned on the beveled edge 10a and the external surface 10b so as to cover the corner 10c.

Thereafter, as shown in Fig. 5, the base or forming element 15 which is positioned around the casing 10 and the inner carrier pipe 11 is fastened to the casing 10 by a masking tape strip 26 and to the inner carrier pipe 11 by a masking strip 27. The element 15 thus extends around the external surface of the inner pipe 11 to span the area at the open end 14a of the annular space 14. The annular layer 15 thus forms a tapered or inclined surface (Fig. 5) extending from the edge 10a of the casing 10 to the external surface of the inner pipe 11, whereby a supporting or base surface is formed for the application of the seal coating, as will be explained. The element 15 may be formed of numerous materials, but preferably the material should be flexible or stretchable in any direction so as to provide for elongation or stretching thereof in the event that the casing seal C is subject to elongation, movement, or extension upon movement of the inner carrier pipe 11 relative to the outer casing 10. The material of the element is of course subject to variation but it has been found that cotton cloth, commercially known as rumple cloth #260, is satisfactory. Fiber glass gauze or cloth could also be used and so long as the material is stretchable and can function as a support or base surface, it will serve the purpose. It is preferable that the annular element or base surface be placed under a slight tension or stretch when initially applied so that no folds are caused in the tapered or inclined portion thereof, whereby a substantially even surface is available for subsequent spraying applications of the sealing coat.

Either before, after, or during the application of the element 15 to the casing 10 and the inner pipe 11, an annular area of adhesive 29 is applied to the external surface 10b of the casing 10 and a similar annular area of adhesive 30 is applied to the external surface of the inner carrier pipe 11. This adhesive 29 is applied at an annular area which is spaced longitudinally from the end of the element 15 so that an annular portion 31 which is free from adhesive, is provided on the external surface of the casing 10. Similarly, a non-adhesive annular portion 32 is provided on the external surface of the carrier pipe 11 by spacing the annular adhesive area 30 from that end of the element 15 which overlies the pipe 11 (Fig. 6). The adhesive applied at the annular areas 29 and 30 may be of numerous known types, so long as it is capable of bonding the metal of the casing 10 and pipe 11 to the material of which the sealing coat 16 is formed. For example, when the sealing or cover coat 16 is made of a material such as a vinyl resin plastic, the adhesive used at the areas 29 and 30 must be capable of adhering the vinyl resin plastic coat to the metal of the casing 10 and pipe 11.

In Fig. 7, the step of applying the sealing coat 16 to the casing 10 and the inner carrier pipe 11 is illustrated. This sealing coat is applied to the end of the outer casing 10 and to a portion of the inner carrier pipe which projects from the end of the casing 10 and obviously overlies the supporting element 15. The sealing coat 16 completely encircles the end of the casing 10 and the carrier pipe 11 for a longitudinal distance which extends from the outer end of the adhesive area 29 to the outer end of the adhesive area 30 so that the sealing coat 16 bonds or adheres to the annular areas 29 and 30 having the adhesive thereon and also bonds to the supporting element 15; however, since the non-adhesive areas 31 and 32 are provided on the casing and pipe, the sealing coat does not bond as firmly to these areas as it does to the pipe and casing and therefore if there is a longitudinal movement of the pipe relative to the casing the lesser bond at the areas 31 and 32 will be separated to permit some stretch to occur in the coating without causing detachment of the ends of the coating from the pipe and casing.

The material of which the sealing coat is formed may vary but such material should be elastic, electrically non-conducting, moistureproof, waterproof, and sufficiently flexible or elastic to permit stretching or extension thereof. Preferably, this coating 16 is of a high molecular vinyl resin synthetic plastic.

The seal coat 16 is preferably applied by spraying, although it will be appreciated that it could be brushed or otherwise applied. The coating 16 is preferably built up to a minimum thickness of about forty mils to obtain sufficient thickness to avoid porosity and to prevent rupture upon stretching or extension thereof. The central area of the seal coat 16 in the vicinity of the base layer 15 is generally the thickest portion and the ends of the coat 16 are generally tapered preferably to a feather edge. When the vinyl coats are used, the seal should be permitted to cure for several hours before covering with dirt.

In some cases, it may be desirable to form the sealing coat 16 of a plurality of alternate layers of a sealing material such as a vinyl resin plastic and a fusing coat of a similar vinyl resin plastic. This procedure is illustrated in Fig. 8 of the drawings, wherein it can be seen that the seal coat 16 comprises an initial layer of the sealing material, which is designated by the numeral 16a. After the initial sealing layer 16a is applied, then the next layer is a fusing layer 16b, which is likewise preferably sprayed on to the initial layer 16a and serves to fill any minute pores in the layer 16a which otherwise might open sufficiently to cause leakage when the layer 16a is stretched or extended. The total thickness of the seal coat 16 can thus be built up by the spraying or otherwise applying alternate layers of sealing coats and fusing coats. In Fig. 3, a proposed build-up of a plurality of alternate coats 16a and 16b is illustrated and preferably such thickness developed at the portion of the coat 16 over the base layer 15 will be at least 40 mils, while the ends of the seal coat 16 are tapered to a lesser thickness. To assure that an adequate thickness of each layer is applied, the layers may include different colored dyes so that each alternate edge is a different color and any uncovered areas will therefore be readily apparent.

From the foregoing description of the casing seal of this invention and the method of forming same, it can be seen that the casing end seal basically provides base or supporting element 15 which spans or extends over the annular open end 14a of the casing 10 and forms a support for the sealing coat 16, which is bonded thereto and is also bonded or attached to the end of the casing 10 and to the external surface of the inner carrier pipe 11. Since the inner carrier pipe 11 is subject to shifting or moving longitudinally or axially relative to the outer casing 10, the flexibility or elasticity of the seal coat 16 and the stretchability of the base or supporting element 15 permit the seal to extend or stretch during such longitudinal movement without rupturing or fracturing, whereby the seal is maintained at all times. Also, the seal coat C of this invention can be applied whether the inner carrier pipe 11 is spaced concentrically or eccentrically with respect to the outer casing 10 since the base or supporting element 15 can be readily encircled about the ends of the casing 10 and the carrier pipe regardless of the positioning of the casing and the inner pipe. Likewise, the sealing layer 16 can be readily applied, whether the inner carrier pipe 11 is concentrically or eccentrically disposed within the casing 10.

It should be again noted that the seal coat 16 can be a single layer of suitable elastic and waterproof material. Also, it should be pointed out again that the layer 16, whether composed of a plurality of layers or a single layer, may be any material which is elastic and waterproof and that the invention is not limited to the vinyl resin materials disclosed.

The foregoing disclosure and description of this invention are illustrative and explanatory thereof, and various changes in the size, shape and materials, as well as in the details of the illustrated construction, may be made within the scope of the appended claims without departing from the spirit of the invention.

What is claimed is:

1. A casing end seal adapted to seal off an annular space between an outer casing and an inner carrier pipe of lesser diameter than the outer casing and which is supported in the outer casing for limited longitudinal movement relative to said outer casing, comprising a supporting element of flexible material surrounding the end of the casing and extending from said end of the casing to the external surface of the inner carrier pipe projecting from the end of the casing to span the annular space between the pipe and casing, and a sealing coat having elastic properties covering said element and supported thereby whereby the combined flexible material and sealing coat forms a moistureproof seal between the casing and the inner pipe, said seal being capable of flexing without rupturing upon a movement of said inner pipe relative to said casing, said sealing coat extending beyond the ends of said layer of flexible material and being bonded to the casing and the inner carrier pipe beyond said flexible material.

2. The casing end seal set forth in claim 1, wherein said supporting element of flexible material is cotton cloth and said elastic sealing coat includes a vinyl resin layer.

3. A method of forming a casing end seal to seal off an anular space between an outer casing and an inner carrier pipe of lesser diameter than said casing extending therethrough and projecting from one end of the casing, comprising the steps of covering a portion of the external surface at said one end of the casing and a portion of the external surface of the inner carrier pipe projecting therefrom with an annular forming element, adhering the central section of an annular sealing coat of elastic material to said forming element, adhering one end of the sealing coat to the external surface of the casing at an annular area spaced from the end of the forming element overlying the end of the casing, and adhering the other end of the sealing coat to the external surface of the inner carrier pipe at an annular area spaced from the end of the forming element overlying said inner carrier pipe, whereby the forming element and sealing coat coact to form a waterproof and moistureproof seal between the casing and the inner pipe which is yieldable upon longitudinal movement of the inner pipe relative to the casing to prevent rupturing of the seal.

4. A method of forming a casing end seal to seal off an annular space between an outer casing and an inner carrier pipe of lesser diameter than said casing projecting from one end of the casing, comprising the steps of, appplying an annular forming element around a portion of the external surface of the casing at said one end thereof and around a portion of the external surface of the inner carrier pipe projecting from the casing, coating an adhesive on an annular area of the external surface of the casing spaced from the end of the forming element overlying the casing, coating an adhesive on an annular area of the external surface of the inner pipe spaced from the end of the forming element overlying said pipe, and then bonding an annular elastic sealing coat to said casing and said inner carrier pipe at the adhesive areas and to said forming element while leaving said sealing coat unadhered at the spaced area between each end of the forming element and each of the adhesive areas to thereby permit extension of said sealing coat upon longitudinal movement of the inner pipe relative to the casing without rupture of the sealing coat and without breaking of the bond.

5. A method of forming a casing end seal to seal off an annular space between an outer casing and an inner carrier pipe of lesser diameter than said casing projecting from one end of the casing, comprising the steps of, applying an annular yieldable element around a portion of the external surface of the casing at said one end thereof and around a portion of the external surface of the inner carrier pipe projecting from the casing, coating an adhesive on an annular area of the external surface of the casing spaced from the end of the yieldable element overlying the casing, coating an adhesive on an annular area of the external surface of the inner pipe spaced from the end of the yieldable element overlying the casing, and then spraying alternate annular coats of sealing and fusing material on said carrier pipe and said casing so that the coats extend from the outer end of the adhesive area on the casing to the outer end of the adhesive area of the carrier pipe, whereby a flexible sealing coat is provided which is firmly adhered only to the adhesive areas and the yieldable element so that elongation of the sealing coat can be effected without rupture thereof.

6. A casing end seal adapted to be applied to one end of a casing and an inner carrier pipe of lesser diameter than said casing and projecting therefrom, comprising an annular yieldable gauze element covering an annular portion of the external surface of said one end of said casing and an annular portion of the external surface of the inner pipe, and a sealing coat adhered to said gauze element and to the casing and the inner pipe at annular areas spaced from the end of said gauze element whereby a seal is provided between the casing and the inner pipe which is maintained during movement of the inner pipe relative to the casing.

7. The structure set forth in claim 6, wherein said sealing coat includes alternate coats of sealing and fusing material.

8. A method of forming a casing end seal to seal off an annular space between an outer casing and an inner carrier pipe projecting from one end of the casing, comprising the steps of, attaching a supporting element of yieldable material to the casing and the pipe in a position spanning the annular space therebetween, and thereafter applying a sealing material in overlying relationship to said element and to the outer surfaces of the outer casing and inner pipe upon the areas beyond the ends of the supporting element.

9. A method of forming a casing end seal to seal off an annular space between an outer casing and an inner carrier pipe projecting from one end of the casing, comprising the steps of, attaching a supporting element of yieldable material to the casing and the pipe in a position spanning the annular space therebetween, thereafter applying a sealing material in overlying relationship to said element and to the outer surfaces of the casing and the pipe upon the areas beyond the ends of the element, and thereafter adhesively securing the end portions of the sealing material to the pipe and to the casing, that portion of the sealing material between the secured end portions and the ends of the supporting element being free from adhesive attachment to the casing and pipe.

References Cited in the file of this patent

UNITED STATES PATENTS

| | | |
|---|---|---|
| 2,024,602 | Roberts | Dec. 17, 1935 |
| 2,383,582 | Barbehenn | Aug. 28, 1945 |
| 2,545,030 | Isenberg et al. | Mar. 13, 1951 |
| 2,577,427 | McDermott et al. | Dec. 4, 1951 |
| 2,623,837 | Butler | Dec. 30, 1952 |

FOREIGN PATENTS

| | | |
|---|---|---|
| 437,340 | Italy | July 1, 1948 |